Dec. 26, 1950   B. M. OLIVER   2,535,811
VOLTAGE DIVIDER CIRCUIT
Original Filed Aug. 26, 1947
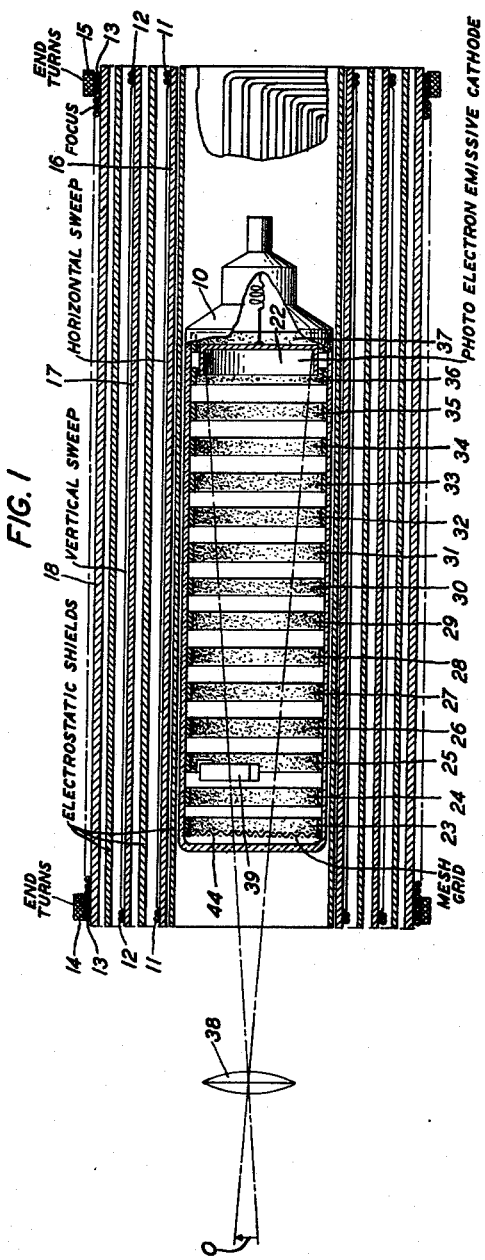
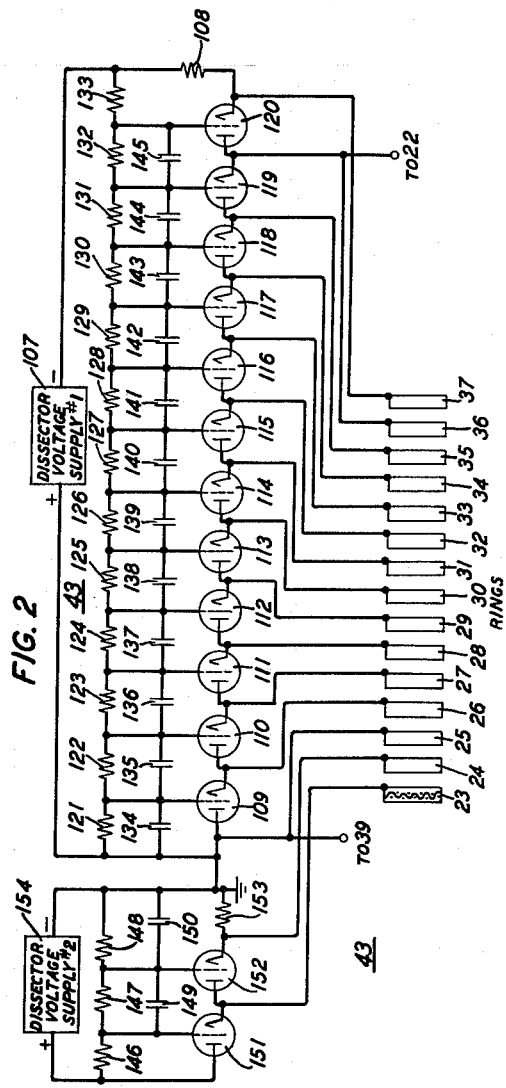
INVENTOR
B. M. OLIVER
BY
ATTORNEY Patented Dec. 12, 1950

2,533,811

UNITED STATES PATENT OFFICE 2,533,811

JUICE EXTRACTING DEVICE WITH
VIBRATING STRAINER

Ivar Jepson, Oak Park, Ill., assignor to Sunbeam
Corporation, Chicago, Ill., a corporation of
Illinois Application February 1, 1946, Serial No. 644,761

17 Claims. (Cl. 146—3)

This invention relates to devices for extracting juice and pulp from fruits and vegetables.

Heretofore devices of this kind have been provided which are motor operated, but the constructions have been inherently of a complicated nature involving relatively high cost of manufacture.

The present invention aims to improve and simplify devices of this kind by the provision of a novel organization of parts designed to perform the desired juice extracting and straining functions and to permit of manufacture at a low cost.

One of the objects of the invention is to provide a new relationship between the juice bowl, the strainer and the reamer, whereby the strainer is rapidly moved back and forth by direct motion transmitted from the reamer or its spindle shaft, and in which this movement depends on a further connection between the strainer and the bowl. This new relationship provides a simple and practical construction having low cost of manufacture.

Another object of the invention is to provide a juice extractor and strainer of the character described in which the juice extracting and straining parts together with the strainer operating means are disposed entirely within the juice bowl and are easily and conveniently removable for cleaning.

Another object of the invention is to provide an improved juice extractor having a comparatively large juice and pulp capacity without danger of pulp and seeds working down into the bottom of the juice bowl.

Still another object is to provide a combined juice extractor and reamer of the character described, especially adapted for coaction with an electric food mixer of the household type.

Another object is to provide a number of embodiments of the invention, each species having features of construction in common as well as distinguishing from the other.

Other objects and dependent advantages will be appreciated by those skilled in this art as the invention becomes better understood by reference to the following description when considered in connection with the accompanying drawings, in which:

Figure 1 is a vertical section through a combined juice extractor and strainer embodying my invention;

Figure 2 is a fragmentary horizontal section taken substantially on the section line 2—2 of Figure 1;

Figure 3 is a vertical section showing another embodiment of the invention;

Figure 4 is a section taken substantially on the section line 4—4 of Figure 3;

Figure 5 is a vertical section showing a further embodiment of the invention;

Figures 6 and 7 are sections taken substantially on the section lines 6—6 and 7—7, respectively, of Figure 5, omitting the reamer; and Figure 8 is a horizontal section generally similar to Figure 2, but showing still another embodiment of the invention.

In the illustrative embodiments I have shown my invention as applied to a well-known type of juice extracting device characterized by an open-top juice bowl, a rotary reamer or scraper of general cone shape adapted for extracting juice and pulp from citrus fruit, and a strainer located in the bowl to receive the juice and pulp. It has been common to operate devices of this kind by an electric motor connected directly to the reamer shaft or spindle and to mount the strainer so that it is coaxial with the reamer shaft and to provide more or less complicated motion-translating means operated by the motor shaft and functioning to oscillate the strainer upon and coaxially about its center mounting. It has also been known to rotate the strainer with the reamer, but this involves a different method of straining wherein the juice is separated mainly by centrifugal action. This latter method is not satisfactory because of the high speed necessary and because the pulp does not uniformly distribute around the strainer wall and is apt to set up an objectionable vibratory action due to the lack of dynamic balance. Devices of the kind described have also been applied to electric food mixers in which both the reamer spindle or shaft and the strainer are operated through separate drive-transmitting trains from an electric motor or motor-driven means housed or encased as part of the motor unit.

The present invention is illustrated as applied to the motor unit of a food mixer, but it will be understood that the invention may be applied in connection with any suitable support and power drive.

Referring to the embodiment illustrated in Figures 1 and 2, I have shown an open-top juice bowl designated generally by 11, having in its bottom wall 12 a center opening 12a and a drain or downspout opening 12b. In this embodiment the opening 12a is tapered to fit a correspondingly tapered stud 14 integral with a motor casing 20 and serving as a support for the bowl. The reamer 16 may be of any design suitable for extracting juice and pulp from fruits and vegetables. In this embodiment the reamer is of ceramic or plastic material having a metal insert 17 threaded to the upper end of a spindle or drive shaft 18. This reamer spindle extends down into the hollow stud 14 and has a separable connection 19 at its lower end in a drive sleeve or shaft 21 which is journalled in the casing 15. In this instance the sleeve 21 is fixed to a worm gear 22 which is driven by worm 23 which, in turn, is coaxial with the armature shaft of the electric motor and is driven thereby. The drawing shows a well-known type of food mixer motor unit in which the casing 20 is the motor casing and also serves to support the juice bowl.

In the preferred embodiment of my invention a perforated strainer, designated generally by 24, is supported on the juice bowl with its vertical axis parallel with the reamer shaft 18 with capacity for rapid back-and-forth movement in order to perform a shaking and scudding action for straining of the juice from the juice and pulp mixture which is extracted by the reamer or scraper. In this embodiment the side or bottom wall of the juice bowl is provided with a ledge or shelf 25 extending entirely around the inner wall of the bowl so as to provide a continuous seat for the marginal portion of the strainer. Thus the strainer, together with this ledge or shelf and the side wall of the juice bowl, provide a comparatively large-capacity receptacle for catching and retaining the extracted material. The ledge provides a supporting surface on which the strainer is rapidly moved back and forth in a shaking action for the purpose of facilitating separation of the juice from the pulp. It will also be noted that with this construction there is no free space between the periphery of the strainer and the bowl which would permit pulp and seeds to pass down into the bottom of the juice bowl. Also, this construction provides a partition and seal between what may be termed the upper and lower compartments of the juice bowl, so that the only passage between said compartments is through the strainer perforations. The perforations in the strainer may be of any suitable size, shape, and arrangement, according to the nature of the material being separated and other factors such as the rapidity and magnitude of the strainer movement. The straining portion is substantially flat, reinforced by annular ribs and perforated throughout, as shown diagrammatically in Figure 2. In this embodiment the strainer is moved back and forth as in an oscillating movement about the fulcrum 26 formed by a rib extending inwardly from a side wall of the juice bowl. The strainer has a slot or recess 27 in a marginal portion which receives the rib 26 and completes the fulcrum connection.

My invention contemplates the provision of means operating directly between the reamer or the reamer shaft for imparting to the strainer the described back-and-forth movement simultaneously with rotation of the reamer. In the preferred embodiment this is accomplished by an eccentric cam 28 fixed to the reamer spindle shaft 18 at a level above the strainer and within the hollow of the reamer, together with a cam follower 29 fixed to the center of the strainer. I prefer to provide the strainer with a raised central hub portion 31 at a sufficient level to prevent the juice from overflowing at the center or from reaching the cam surfaces. This raised central hub portion 31, as is obvious from the drawings, effectively provides an upwardly extending tubular wall. The cam follower 29 is preferably a graphite-impregnated, laminated, plastic material for the purpose of providing good wearing qualities and long life. The cam follower member 29 may be suitably fixed to the strainer hub as by punching portions 32 into recesses in the member 29 and tabs 33 into retaining engagement beneath said member. It will be apparent that rotation of the reamer causes simultaneous operation of the strainer in a back-and-forth movement, in this instance an oscillating movement about the fulcrum 26 which is located at the outer wall of the juice bowl.

In use of the invention with a food mixer wherein the reamer is driven from a power take-off shaft such as the shaft 21, I prefer to first use the reamer operating at a suitable speed for the juice and pulp extracting function and follow up by operating the strainer at a higher speed for completing the straining function. For example, in the embodiment applied to a food mixer, the motor control speed may be set to rotate the reamer about 370–400 R. P. M. for juicing, and following this the motor speed may be set to the highest which in at least one well-known form of food mixer is 900 R. P. M. and upwards for the reamer, imparting correspondingly rapid movements to the strainer.

In the embodiment shown in Figures 3 and 4, the juice bowl may be the same as in the embodiment Figure 1, and the strainer 34 may be supported on the marginal ledge or shelf 25 so as to oscillate about the fulcrum 26. However, in this embodiment the back-and-forth movement to the strainer is imparted directly by the reamer 16. This is accomplished by forming or otherwise providing on the reamer an annular cam surface 35 eccentric with respect to the reamer spindle shaft 18 and providing a strainer with an upstanding hub portion 36 annular in form so as to coact with the cam surface 35. By reason of this construction the strainer will be oscillated back and forth about the fulcrum 26 when the reamer is rotated, the strainer movement being similar to that in the first described embodiment.

In Figures 5, 6, and 7, I have shown another embodiment of the invention in which the strainer 37 rests marginally on the ledge or shelf 25. An eccentric cam 38 fixed to the reamer spindle shaft 18 coacts with a cam follower 39 suitably fixed to the raised stub portion 41 of the strainer, similar to the first described embodiment. However, in this case the strainer is retained against rotation around the reamer shaft by fulcrum means located at the center of the juicer assembly as distinguished from locating the fulcrum at the marginal portion illustrated in the above described embodiments. In this case the center stub portion 41 of the juice bowl is shaped to provide one or more rib-like portions 43 which coact with correspondingly located socket portions 42 formed in the center hub of the strainer. These coacting rib and socket portions serve to prevent the strainer from rotating in the juice bowl and at the same time permit the strainer to have freedom of motion in response to the action of the rotating cam 38. With this construction the strainer is oscillated in a back-and-forth movement modified by the several fulcrum points provided by the rib and socket construction.

In the further embodiment illustrated in Figure 8, the juice bowl is the same as in Figure 1 except that diametrically opposed fulcrum ribs 44 and 45 are provided at the marginal portion of the bowl and the strainer 46 is provided with corresponding slots or recesses 47 and 48 which coact with the fulcrum ribs 44 and 45, respectively, thus fect of decreasing the impedance as seen by the rings of the dissector tube 10. Currents drawn by these rings in the dissector therefore have little effect on the potentials of the rings.

The operation of the system shown in Figs. 1 and 2 will now be described. An image of the object O is focussed upon the photoelectric cathode 22 by means of the lens system 38 and photoelectrons emitted from this cathode are formed into a beam having a cross-sectional area corresponding to that of the optical image. The potentials applied to the rings 23 to 35, inclusive, are sufficiently large to produce saturated photoemission from the cathode 22. For example, the ring 35 nearest the ring 36 at cathode potential is placed at a potential of about 100 volts positive with respect to the cathode and the following rings have progressively larger potentials applied thereto, the difference between two successive rings being approximately 100 volts.

Since the rings in the dissector are uniformly spaced along the axis of the tube, a substantially uniform axial electric field throughout the volume of the dissector is produced if the potential difference between adjacent rings is the same for all rings, and provided the cathode 22 and mesh cap 44 are respectively placed at the potentials of the rings having the same axial position. The potentiometer circuit of Fig. 2 and the construction of the tube 10 are such as to permit these conditions to be met.

The uniform axial field set up by the focussing coil 13 in cooperation with the substantially uniform electric field produced by the potentials applied to the conducting rings 23 to 37, inclusive, and the cathode 22 and mesh cap 44, bring the photoelectrons to a focus in the plane of the aperture in the pick-up member 39, thus forming an electron image of the object in this plane. The horizontal and vertical sweep coils 11 and 12 produce magnetic fields uniform in intensity throughout the dissector volume and in directions transverse to the axis of the dissector. Each field, which is continuously varying with time due to the saw-toothed current applied to the coils, sweeps the entire electron image across the aperture of the pick-up member 39, thereby allowing successive elements in the electron image to pass through the aperture. The output of the pick-up member 39 is amplified and prepared for transmission over the antenna in a manner well known to the workers in the television art. If a motion picture film is the object O, one of the sweep coils need not be used, one direction of the scanning being supplied by the motion of the film.

Various modifications can be made in the various embodiments of the invention described above without departing from the spirit thereof, the scope of which is indicated in the claims.

What is claimed is:

1. A vacuum tube voltage divider circuit comprising a source of direct power, a plurality of serially connected resistors between the positive and negative terminals of said source, a plurality of individual condensers respectively connected across each of said resistors except the last one, a plurality of vacuum tubes, each having an anode, a cathode and a control element, having their anode-cathode paths connected in a series circuit between the terminals of said source of power, means for connecting the common terminal of each pair of adjacent resistors in said series to the control element of a corresponding one of said tubes, and means for taking output voltages from the cathodes of said tubes.

2. A vacuum tube voltage divider circuit comprising a source of power, a plurality of resistors connected in series between the positive and negative terminals of said source, a series circuit including the anode-cathode paths of a plurality of tubes each containing an anode, a cathode and a control element connected between the terminals of said power supply, means for connecting each of the common terminals of successive ones of said resistors in the series arrangement of resistors to the control element of a respective tube, means for connecting a condenser across each of said resistors except the one connected to the positive terminal of said source of power, and means for taking output voltages from the cathodes of said tubes.

3. A vacuum tube voltage divider circuit comprising a source of direct power, a plurality of serially connected resistors between the positive and negative terminals of said source, a plurality of individual condensers respectively connected across all of said resistors except one at one end, a plurality of electron discharge devices, each having an anode, a cathode and a control element, having their anode-cathode paths connected in a series circuit between said terminals, means for connecting the common terminal of each pair of adjacent resistors in said series to the control element of a corresponding one of said discharge devices, and means for taking output voltages from the cathodes of at least some of said tubes.

4. A vacuum tube voltage divider circuit comprising a source of direct power, a plurality of serially connected resistors between the positive and negative terminals of said source, a plurality of individual condensers respectively connected across each of said resistors except the last one, a plurality of vacuum tubes, as many as there are condensers and each having an anode, a cathode, and a control element, having their anode-cathode paths connected in a series circuit between the terminals of said source of power, means for connecting the common terminal of each pair of adjacent resistors in said series to the control element of a corresponding one of said tubes, and means for taking output voltages from the cathodes of all of said tubes.

BERNARD M. OLIVER.

REFERENCES CITED

The following references are of record in the file of this patent:

UNITED STATES PATENTS

| Number | Name | Date |
| --- | --- | --- |
| 2,452,037 | Cook | Oct. 26, 1948 |

OTHER REFERENCES

Publication: A Regulated High Voltage D. C. Power Supply, David W. Taylor Model Basin, Report 561, July, 1946 (pp. 11–15 and Fig. 8).